May 29, 1956  E. N. CALHOUN  2,748,228
INDICATING MEANS
Filed May 28, 1953
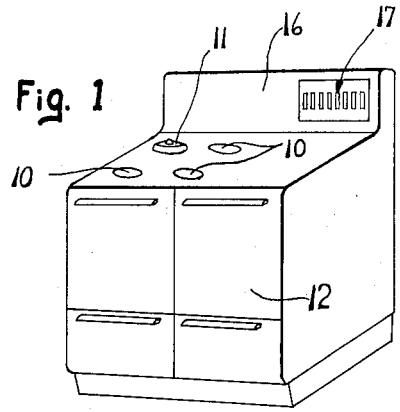
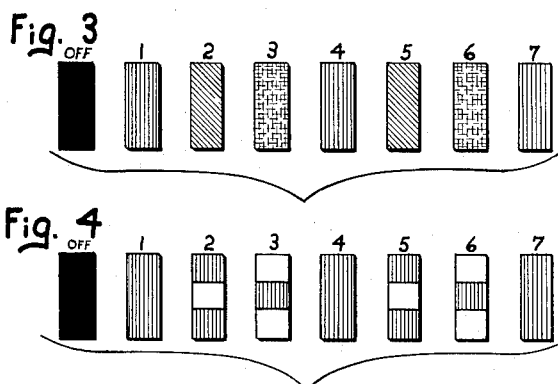
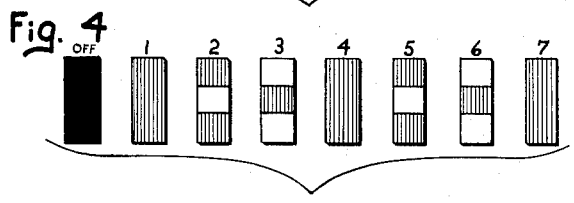
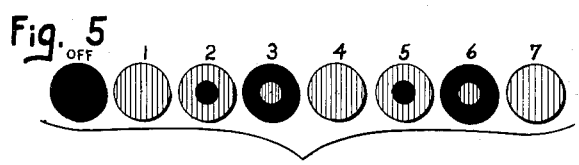
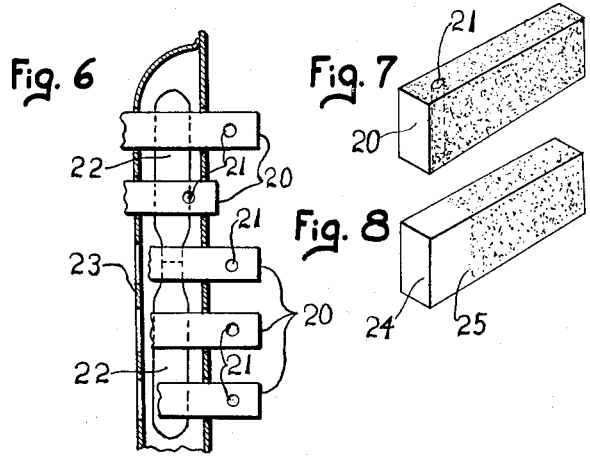
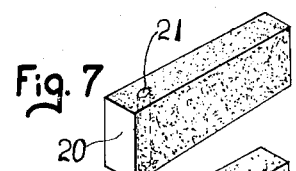
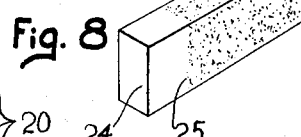
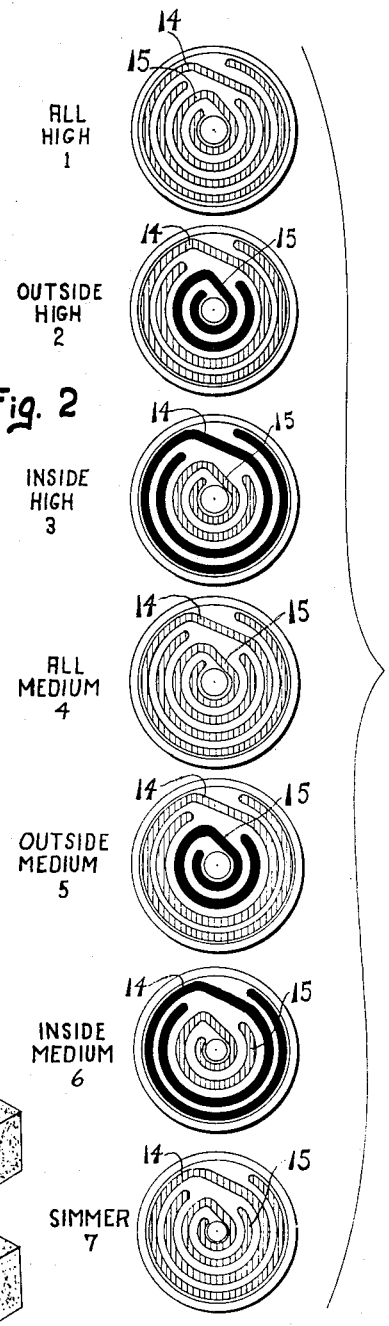
INVENTOR.
ERNEST N. CALHOUN
BY
Attorney

United States Patent Office 2,748,228
Patented May 29, 1956

2,748,228
INDICATING MEANS

Ernest N. Calhoun, Pittsburgh, Pa., assignor to Edwin L. Wiegand Company, a corporation of Pennsylvania Application May 28, 1953, Serial No. 358,125

1 Claim. (Cl. 200—167)

My invention relates to means for indicating the various positions of a multiple-position control means, particularly to means for indicating the position of a multiple-position electrical switch, and the principal object of this invention is to provide new and improved indicating means of such character.

Electric ranges of present-day manufacture include a plurality of surface units and an electrically heated oven. In most cases one or all of the surface units comprise a plurality of heating elements adapted to be connected in various ways to a source of electrical current to produce various heating arrangements.

In some of the prior art ranges, the positions of the switch for controlling energization of a respective surface unit have merely been numbered to indicate the various heats produced by selective actuation of the switch operating means and in some cases the latter means comprises a plurality of push-buttons, one for each heat, and such push-buttons have been numbered to indicate its respective heat.

Other prior art ranges have the push-buttons colored but no consideration has been given to the coloring of the push-buttons to enable a housewife to tell at a glance which heat will be produced by which push-button and as a consequence most manufacturers were obligated to retain the numbering system to avoid confusion of the housewife.

My invention makes it possible to quickly and easily ascertain which push-button will produce the heat desired and therefore the use of numbers, which are difficult to read especially by persons with bi-focal glasses, may be entirely eliminated.

In the drawing accompanying this specification and forming a part of this application, there are shown, for purposes of illustration, several embodiments which my invention may assume, and in this drawing:

Figure 1 is a perspective view of an electric range in which any one of the embodiments of my invention may be used, Figure 2 is a diagrammatic representation of the various heats obtainable on one or all heating units of the electric range, Figures 3, 4 and 5 are diagrammatic representations of the push-buttons of various embodiments of my invention, Figure 6 is a fragmentary sectional view of still another embodiment of my invention, and Figures 7 and 8 illustrate parts useable in the construction shown in Figure 6.

The electric range shown in Figure 1 may be of any commercially available type and may comprise a plurality of surface units 10, a deep-well cooker unit 11, and an oven 12. It will be appreciated that suitable electric heating elements are used to form the surface units 10, and that suitable electric heating elements are used to provide heat for the deep-well cooker and the oven.

In most modern electric ranges each of the surface units 10 comprises a plurality of electric heating elements adapted to be variously connected in circuit with a source of electrical current so as to provide various heating characteristics. It will be appreciated that the elements for the deep-well cooker and the oven may also be so connected as to provide various heats.

In the embodiments herein disclosed, each of the surface units 10 comprises a pair of sheathed, electric resistance elements, the elements being disposed one about the other to provide an outer element 14 and an inner element 15. In well known manner, and through use of suitable electrical circuits and switching means, each surface unit may be so energized to produce a number of different heats, and as shown in Figure 2, the embodiments herein disclosed utilize a surface unit, and suitable electrical circuits, to provide an all high heat in position 1 wherein both inner and outer elements are at high wattage to produce the maximum of heat.

Both inner and outer heating elements 14 and 15 may be electrically connected to the source of current to produce less heat, such as shown at "all medium" in position 4 and still less heat as shown at "simmer" in position 7. In positions 2 and 5 only the outer coil is energized and in position 2 the energization is at high wattage whereas in position 5 the energization is at a lower wattage, for example one-fourth of high wattage.

In positions 3 and 6 only the inner coil is energized and in position 3 the energization is at high wattage whereas in position 6 the energization is at a lower wattage, again one-fourth of high wattage for example. Thus, it will be appreciated that the various heats provided by a single surface unit enables great flexibility in cooking operations at a minimum of cost.

My invention provides means for clearly and concisely indicating the various heats of the surface units and eliminates squinting and stooping or bending to read the position numbers and also eliminates guess work common to prior controls which incorporate color. Although the embodiments of the invention are disclosed in their preferable combination with an electric switch of the push-button type, it will be appreciated that the invention is not limited to such combination and that other types of switches, such as rotary switches, may be used.

With particular reference to the preferred switch combination, the usual push-button switch comprises switching mechanism which provides for selective energization of any one of a number of electrical circuits to establish the desired heat of the respective surface unit. The switch may be of any commercially available type and accordingly is not shown in detail. Preferably, the switch is mounted on the upright splash shield 16 of the range with its set of push-buttons 17 extending outwardly from the forward surface of such shield. Only one set of push-buttons is shown in Figure 1 and it will be appreciated that similar sets of push-buttons may be provided for each of the surface units and for the elements in the deep-well cooker.

In the case of surface units providing the specific various heats as shown in Figure 2, the electric switch will have eight push-buttons, one for "off" position and the other seven corresponding to the seven heats shown in Figure 2. For convenience in identification, seven push-buttons in the embodiments shown in Figures 3, 4 and 5 have been numbered one through seven and respectively correspond to the heats shown in Figure 2, although for commercial use such numbers may be omitted since the housewife, through use of my invention, will easily be able to identify the push-button for the desired heat.

With particular reference to Figure 3 of the drawing, the embodiment of the invention therein disclosed comprises an "off" push-button which may be black, white or otherwise, as desired, to suitably indicate that all electrical circuits to both elements are interrupted. Push-buttons for positions 1, 4 and 7 are colored a common color, such as red, to indicate that both heating elements are energized and preferably push-button for position 4 will be lighter red than the color of push-button for position 1, while push-button for position 7 is preferably colored a still lighter red, so as to show that such push-buttons provide a gradual reduction in heat with both elements energized.

Push-buttons for positions 2 and 5 are colored with a common color to distinguish from the color of push-buttons for positions 1, 4 and 7, and to show that only the outside heating element is being energized. The color green may be used to distinguish from the red color of push-buttons for positions 1, 4 and 7, and push-button for position 5 may be of a lighter shade of green than push-button for position 2 to show that less heat is being generated in position 5.

Push-buttons for positions 3 and 6 are colored a common color to distinguish from the color of the other push-buttons, and to show that only the inner heating elements are energized, and yellow may be used for such purpose. As before, push-button for position 6 may be of a lighter shade of yellow than push-button for position 3 to show that less heat is being generated in position 6.

Thus, it will be clear that the housewife will be able to tell at a glance which push-button controls which heat without being required to guess and choose from a group of colors having no significance. Further, since all push-buttons are visible and the colors of such push-buttons easily and permanently distinguished, the confusion and guess work caused by certain prior art switches which change colors as the heats are increased or decreased is eliminated.

Referring to the embodiment of the invention disclosed in Figure 4, the same general principles of common coloring is carried out and in this respect push-buttons for positions 1, 4 and 7, as before, may be colored red and preferably of distinguishing shades of red. Push-buttons for positions 2 and 5 may have outer parts red and the intermediate another color, or white, to indicate that only the outer heating element is energized, and the color may be of distinguishing shades of red to indicate the two heats.

Push-buttons for positions 3 and 6 may have a center part colored red, and outer parts some other color, or white, to indicate that only the inner heating element is energized, and the color may be of distinguishing shades of red to indicate the two heats. Thus, the housewife may readily distinguish the heats by color and also by geometric design outlining such color.

In the embodiment shown in Figure 5, the push buttons are shown as being round although it will be clear that such push-buttons may be oblong as in Figures 3 and 4, or the push-buttons in any of the embodiments may be of any other suitable or desired configuration.

In Figure 5 the generally flat terminal surfaces of the round push-buttons are colored for the purpose intended. Push-buttons for positions 1, 4 and 7 may have their terminal surfaces entirely colored red to indicate that both heating elements are being energized, with the color of the push-buttons for positions 4 and 7 being of a lighter shade of red with respect to each other and with respect to push-button for position 1, to indicate the varying heats.

Push-buttons for positions 2 and 5 may have two colors, one encompassing the other. In this case I prefer to show the outer ring of each push-button as colored red, with the shade of the color differing to indicate the two types of heat. Also, in this case, I prefer to use black for the center of the red ring, to thus indicate that the outer heating element is energized and the inner heating element is deenergized. Push-buttons for positions 3 and 6 may be reversely colored, that is a black ring with a red center to indicate that the inner heating element is energized and the outer heating element is deenergized. Further the red centers may be of different shades to distinguish the heats obtainable.

The embodiment of Figure 5 thus gives visual indication of whether both heating elements are energized or whether the inner or outer heating element only is energized. Red and black are commonly associated with heat and cold respectively and accordingly are preferable to designate energization of the outer and inner heating elements.

In furtherance of the embodiment of Figure 5, it is contemplated that the push-buttons may carry replicas of the heating indications shown in Figure 2, with the heated areas colored red, and varying shades of red, as before and the unheated areas designated black. In such manner, the housewife has complete information at her finger-tips.

The embodiment of the invention shown in Figures 6 through 8 makes use of push-buttons formed of plastic or other suitable light transmitting medium. In Figure 7, each push-button has a frosted exterior, or is otherwise coated so that only the face 20 is clear, and each push-button has an aperture 21 extending transversely therethrough. The push-buttons extend through apertures in the splash shield 16, as is customary, and a light-producing means, such as an electric bulb, or a plurality of bulbs 22, are positioned in back of the splash shield 16, preferably in combination with a reflector 23 which directs light toward the push-buttons.

In operation, and with the push-buttons in extended relation, the apertures 21 will be positioned at the exterior surface of the splash shield 16 and no light will be transmitted through such push-buttons because of their coated exterior. However, when a push-button is depressed, it will move inwardly to position its aperture at the rear of the splash shield 16 and in position to receive light and such light will be transmitted through the clear interior of the push-button and the face 20 will appear to be illuminated.

As before, each of the plastic push-buttons may be of a color suitable to indicate the type of heat produced. Also, a part of the face 20 may be coated, such for example with a black coating, so that light will appear only from a part of the face in order to provide the combination shown in Figures 4 and 5.

Further, each plastic push-button may be formed with a coating as shown in Figure 8 to expose a clear end portion 24. In outwardly extended position, the line 25 of the coating will project slightly beyond the exterior surface of the splash shield, or at least in line with the wall of such shield, so as to prevent light from being transmitted through the body thereof. In depressed position, a portion of the clear end portion will extend beyond the inner surface of the splash shield and the entire end, including that extending beyond the exterior surface of the splash shield, will be illuminated. Here again, the push-buttons may be made of a colored plastic, or be partially coated on the end portion 24, to provide the colors and combinations of the previously described embodiments.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

Push button switch means for control of electrical apparatus having a plurality of operating characteristics, comprising a casing having an opening, an elongated push button reciprocable through said opening and having an outer end portion engaged by an operator to push said button in a direction inwardly of said casing from an outer position to an inner position, said push button having an inner portion associated with an electrical switch to effect switching operation, a light source within said casing and positioned adjacent to said push button, said push button being formed of one-piece solid light transmitting material with an opaque coating covering all but the terminal surface of said outer end portion, and said push button having an aperture extending cross-wise of said outer end portion and disposed outwardly of said casing in the outer position of said push button whereby it is not exposed to light from said light source, said outer portion being disposed at least partially within said casing in the inner position of said push button to dispose its aperture in light receiving relation with said light source whereby light enters said aperture and is transmitted through said push button to said terminal surface to thereby provide a visible signal of the position of said switch.

References Cited in the file of this patent

UNITED STATES PATENTS

| | | |
|---|---|---|
| 2,437,555 | Rees | Mar. 9, 1948 |
| 2,440,063 | Andrews | Apr. 20, 1948 |
| 2,585,503 | Schulze | Feb. 12, 1952 |
| 2,607,874 | Sheilder | Aug. 19, 1952 |
| 2,607,875 | Sheilder | Aug. 19, 1952 |